(12) United States Patent
Schirmer

(10) Patent No.: US 11,312,057 B2
(45) Date of Patent: Apr. 26, 2022

(54) WATER QUENCHING APPARATUS AND PROCESS FOR BLOWN FILM LINES

(71) Applicant: BBS Corporation, Spartanburg, SC (US)

(72) Inventor: Henry G. Schirmer, Spartanburg, SC (US)

( * ) Notice: Subject to any disclaimer, the term of this patent is extended or adjusted under 35 U.S.C. 154(b) by 233 days.

(21) Appl. No.: 16/563,599

(22) Filed: Sep. 6, 2019

(65) Prior Publication Data

US 2020/0298459 A1   Sep. 24, 2020

Related U.S. Application Data

(60) Provisional application No. 62/821,969, filed on Mar. 21, 2019.

(51) Int. Cl.
*B29C 48/21* (2019.01)
*B29C 48/335* (2019.01)
(Continued)

(52) U.S. Cl.
CPC ........ *B29C 48/913* (2019.02); *B29C 48/0018* (2019.02); *B29C 48/10* (2019.02);
(Continued)

(58) Field of Classification Search
CPC ..... B29C 48/0018; B29C 48/10; B29C 48/21; B29C 48/32; B29C 48/335; B29C 48/355;
(Continued)

(56) References Cited

U.S. PATENT DOCUMENTS 3,008,186 A * 11/1961 Voigt .................... B29C 48/908
425/326.1
3,468,995 A   9/1969 Nelson
(Continued)

FOREIGN PATENT DOCUMENTS

CN   1251856 C   4/2006
CN   103358542 B   12/2015
(Continued)

OTHER PUBLICATIONS

Atomization Concept and Theory, Graco, Inc. Form No. 321-027, (c) 1995. (Year: 1995).*
(Continued)

*Primary Examiner* — Xiao S Zhao
*Assistant Examiner* — Joseph S Leyson
(74) *Attorney, Agent, or Firm* — Maxwell J. Petersen; FisherBroyles, LLP

(57) ABSTRACT

A blown film line and process for making blown film, including an annular extrusion or coextrusion die, a plurality of nip rollers at a location remote from the annular die, a blown film bubble extruding from the annular die and traveling toward the nip rollers along a traveling path, an air cooling apparatus in the vicinity of the annular die, and a water cooling apparatus located downstream from the air cooling apparatus along the traveling path. The water cooling apparatus includes a wet porous material in direct contact with the blown film bubble and surrounding an outer circumference of the blown film bubble. The wet porous material continuously wipes the blown film bubble with water as the blown film bubble moves along the traveling path.

15 Claims, 3 Drawing Sheets

(51) Int. Cl.
    *B29C 48/885*     (2019.01)
    *B29C 48/90*     (2019.01)
    *B29C 48/10*     (2019.01)
    *B29C 48/32*     (2019.01)
    *B29C 48/88*     (2019.01)
    *B29C 48/00*     (2019.01)
    *B29L 23/00*     (2006.01)

(52) U.S. Cl.
    CPC .............. *B29C 48/21* (2019.02); *B29C 48/32* (2019.02); *B29C 48/335* (2019.02); *B29C 48/885* (2019.02); *B29C 48/903* (2019.02); *B29C 48/908* (2019.02); *B29K 2023/06* (2013.01); *B29L 2023/001* (2013.01)

(58) Field of Classification Search
    CPC ... B29C 48/885; B29C 48/903; B29C 48/908; B29C 48/913
    See application file for complete search history.

(56) References Cited

U.S. PATENT DOCUMENTS

| | | | |
|---|---|---|---|
| 3,600,488 A | | 8/1971 | Yazawa |
| 3,663,134 A | | 5/1972 | Coquelin |
| 3,887,673 A | * | 6/1975 | Sato ................ B29C 48/912 264/562 |
| 3,904,334 A | * | 9/1975 | Yazawa ............. B29C 48/903 425/71 |
| 4,115,047 A | | 9/1978 | Stelmack |
| 9,017,053 B2 | | 4/2015 | Rubbetke |
| 2007/0187856 A1 | | 8/2007 | Kitauji et al. |
| 2013/0243894 A1 | * | 9/2013 | Schirmer .......... B32B 27/325 425/131.1 |

FOREIGN PATENT DOCUMENTS

| | | |
|---|---|---|
| CN | 102941671 B | 3/2016 |
| CN | 103624970 B | 3/2017 |
| CN | 207808448 U | 4/2018 |
| CN | 10838647 A | 6/2018 |
| DE | 2125903 A1 | 12/1971 |
| DE | 3920194 C | 1/1993 |
| DE | 102005010471 A | 9/2006 |
| EP | 2639038 A1 | 9/2013 |
| GB | 853460 A1 | 11/1960 |
| JP | H06339986 A | 12/1994 |
| JP | H09109274 A | 4/1997 |
| JP | 2007210158 A | 8/2007 |
| WO | 2011058072 A2 | 5/2011 |
| WO | 2011058072 A3 | 5/2011 |
| WO | 2012159233 | 11/2012 |
| WO | 2018126309 | 7/2018 |

OTHER PUBLICATIONS

Advertisement, "Glacer-Flex III," http://www.alphamarathon.biz/alpha-exclusive-technologies/glacier-flex-iii.html, Feb. 4, 2019.

Xiao et al., "Performance Comparison of Water-Quench Versus Air-Quench Blown Films," http://www.beca.com/files/pdf/Karen%20Xian%20Water%20quenched%20vs%20air%20blown%20PPT.pdf, Feb. 4, 2019.

Collin, "Collin Medical Line," https://www.collin-solutions.com/en/product-units/medical-line, Feb. 4, 2019.

European Search Report for European Application 20163325.2, dated Aug. 13, 2020.

* cited by examiner

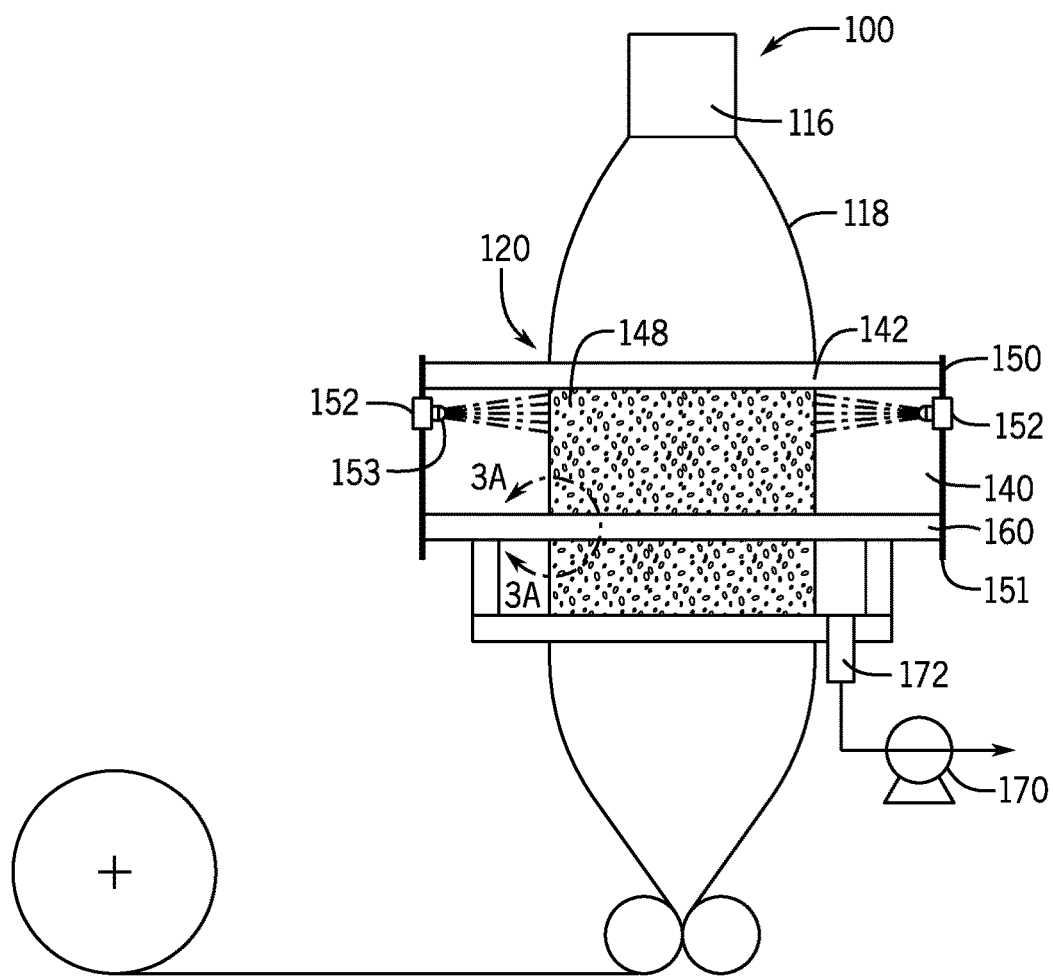
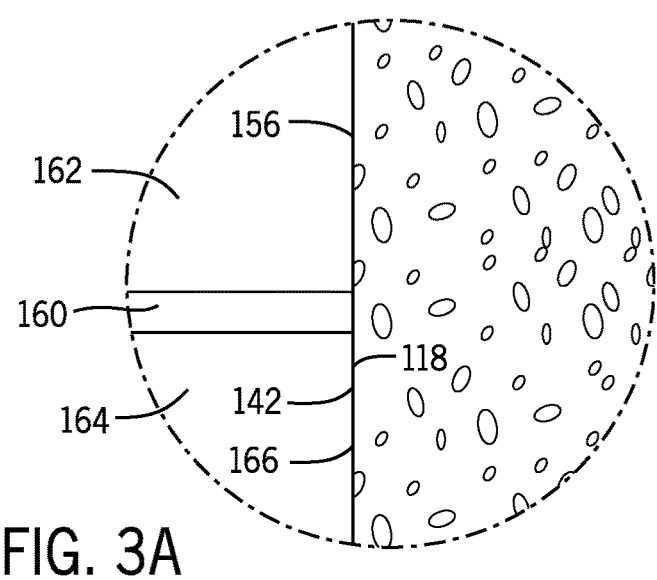
FIG. 3
FIG. 3A

WATER QUENCHING APPARATUS AND PROCESS FOR BLOWN FILM LINES

RELATED APPLICATIONS

This patent application claims priority to U.S. Provisional Application 62/821,969, filed on Mar. 22, 2019, the disclosure of which is incorporated herein by reference.

FIELD OF THE INVENTION

This invention is directed to a water quenching apparatus and process for blown film lines used for making extruded and coextruded films.

BACKGROUND OF THE INVENTION

Blown plastic films are typically made by extruding a single layer or multilayer plastic film through an annular die in the form of a cylindrical "bubble" which is blown out to a desired blow-up ratio and thickness using air injected on the inside at the first (source) end of the bubble, and then collapsed into a flat film using a collapsing frame and rollers positioned at the second (remote) end of the bubble. The bubble may travel in an upward or downward direction from the source end to the remote end. The blow-up ratio is defined as the diameter of the fully blown bubble divided by the diameter of the annular die from which the bubble is extruded. When the blown film is in the molten state near the annular extrusion or coextrusion die, the air blown inside the bubble tends to stretch and widen the film bubble. Once the bubble is fully quenched from a molten to a solid state, its diameter remains essentially uniform until it reaches the collapsing frame and rollers positioned at the remote end of the bubble.

Most conventional blown films are quenched from a molten state to a solid state using high velocity air streams distributed and applied around the circumference of the bubble near the source end. The thickness of the blown film and the blow-up ratio of the bubble are thus controlled or influenced by a combination of variables, including the temperature of the molten film exiting the annular die, the difference between that temperature and the solidification temperature(s) of the film layer(s), the speed of the blown film (driven by the collapsing rollers), and the velocity and temperature of the cooling air applied to the exterior of the bubble. For a given set of process requirements, the velocity and temperature of the cooling air have a significant impact on the blow-up ratio and ultimate thickness of the film, and precise control of the blow-up ratio and film thickness is often challenging.

U.S. Pat. No. 9,193,107, issued to Bertrand, approaches these issues by using a combination of air streams and fluid jets to quench the blown film. An air cooling system applies air across one or more surfaces of the plastic film tube. One or more throttling valves are coupled to a pressurization pump that applies a pressurized working fluid to the film, preferably water. The pressurized fluid is applied in jets at increments on the exterior surface of the blown film bubble. As shown and described, the pressurized fluid jets are not applied at increments around the entire circumference of the bubble, but are only applied on one side.

SUMMARY OF THE INVENTION

The invention is directed to a blown film line that includes an improved water quenching apparatus, and a process for making a blown film. The blown film line includes an annular die, a plurality of nip rollers at a location remote from the annular die, a blown film bubble extruding from the annular die and traveling toward the nip rollers along a traveling path, an air cooling apparatus in the vicinity of the annular die and directing cooling air toward the blown film bubble, and a water cooling apparatus located downstream from the cooling apparatus along the traveling path. In accordance with the invention, the water cooling apparatus includes a wet porous material in direct contact with the blown film bubble and surrounding an outer circumference of the bubble, wherein the wet porous material continuously wipes the outer circumference of the bubble with water as the bubble moves along the traveling path. The water cooling apparatus may also include a vacuum suction device positioned to remove excess water from the wet porous material.

The invention is also directed to a process for making a blown film. The process includes the steps of extruding a blown film bubble from an annular die, moving the blown film bubble along a traveling path toward a plurality of nip rollers, cooling the blown film bubble by applying cooling air in the vicinity of the annular die, directly contacting an entire outer circumference of the blown film bubble with a wet porous material as it moves along the traveling path so as to continuously wipe the blown film bubble with water, and collapsing the blown film bubble in the nip rollers. The process may also include the step of applying a vacuum to remove excess water from the wet porous material.

By continuously wiping the blown film bubble with the wet porous material, the film is provided with a second and final quenching that is uniform around its entire circumference and results in better uniformity and control of film thickness. Suitably, the wet porous material is configured to form a cylindrical cavity and the blown film bubble passes through the cavity. The film thickness is controlled both due to the uniform water quenching and the physical restraint on the diameter of the blown film bubble as it passes through the cylindrical cavity.

BRIEF DESCRIPTION OF THE DRAWINGS

FIG. 3 is a schematic diagram of another example of a blown film line according to the invention, which is a downward blown film line.

FIG. 3A is an enlarged schematic view of the encircled portion of the blown film line of FIG. 3.

DETAILED DESCRIPTION OF THE INVENTION

Figure 1:
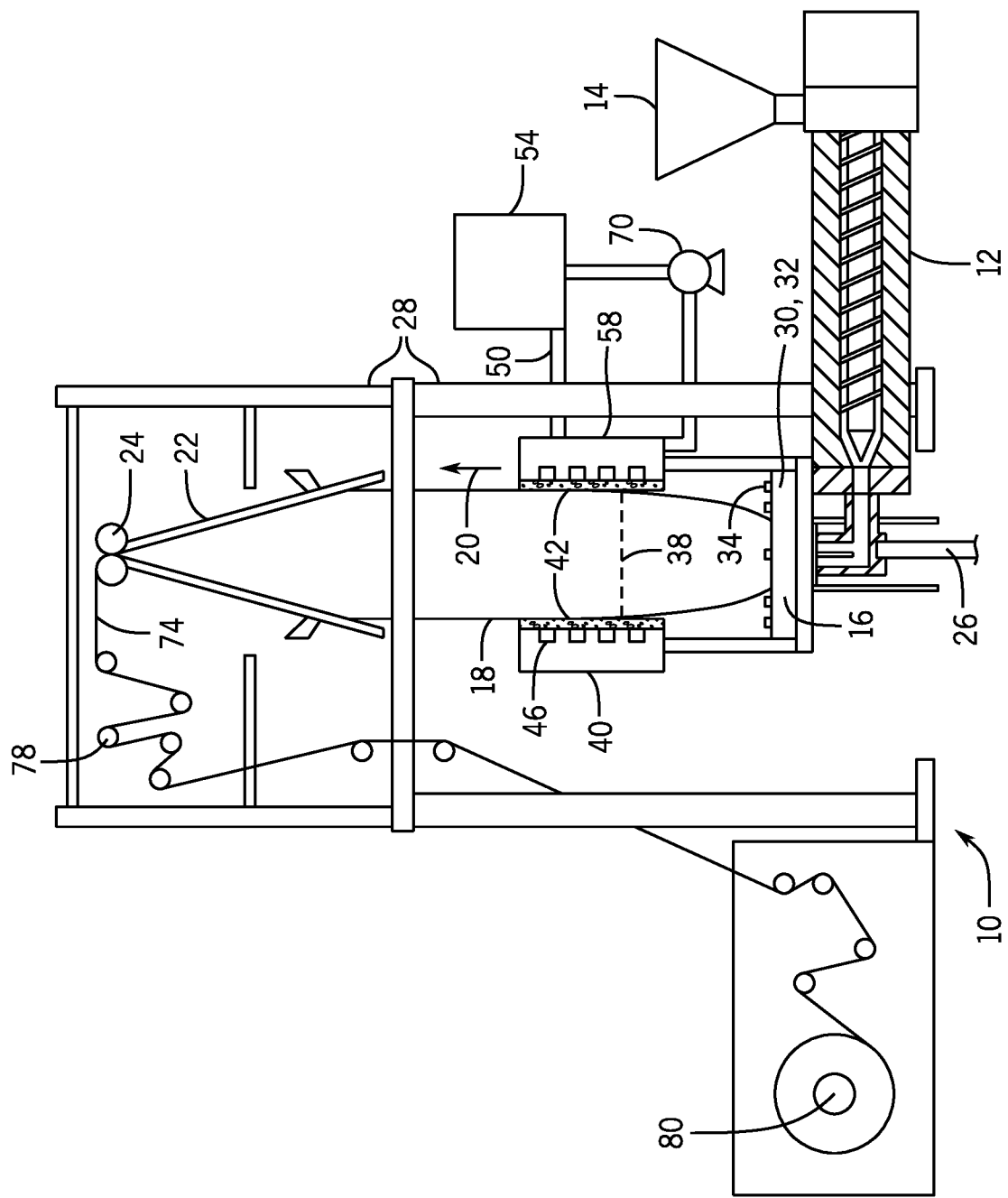
FIG. 1 is a schematic diagram of one example of a blown film line according to the invention, which is an upward blown film line.
Figure 2:
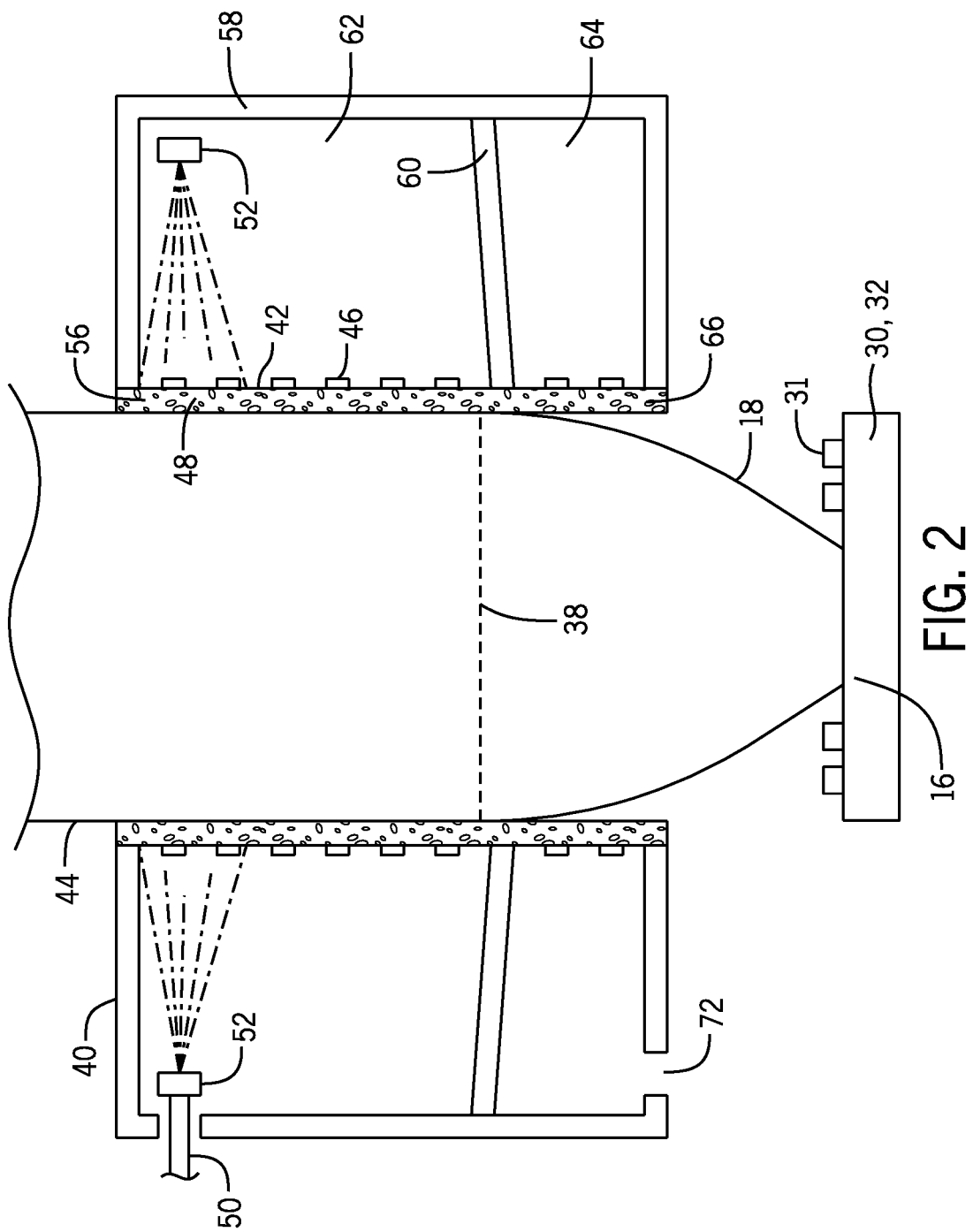
FIG. 2 is an enlarged schematic diagram of the portion of the blown film line of FIG. 1 that includes the water cooling apparatus.

Referring to FIGS. 1 and 2, a blown film line 10 includes one or more extruders 12, each supplied with plastic resin using a hopper 14. The number of extruders 12 and associated hoppers 14 will vary depending on whether the blown film bubble has single or multiple layers, and the number of different plastic resins needed to form multiple layers. Each extruder 12 melts the associated plastic resin, heats the resin to a desired extrusion temperature, and feeds it to an annular die 16 that is configured to produce a blown film bubble 18 having a desired number of layers.

The annular die 16 extrudes the blown film bubble 18 in an upward direction of travel 20 toward a collapsing frame 22 and a plurality of nip rollers 24. A pressure tube 26, positioned below the annular die 16, employs air pressure to help distribute and push the plastic resin through the annular die 16 and inflate the interior of the blown film bubble 18. The various parts of the blown film line 10 may be mounted for stability to an upright frame 28.

An air cooling apparatus 30 is mounted in the vicinity of the annular die 16. The air cooling apparatus 30 includes an air cooling ring 32 that supplies cooling air at a desired temperature and velocity through a plurality of air vents 34. The air cooling apparatus 30 cools the blown film bubble 18, which is initially molten, to a lower temperature that is closer to its solidification point which appears at the frost line 38 along the direction of travel 20.

Once the blown film bubble 18 is cooled to its solidification point, it tends not to expand or widen further, or has limited additional expansion. In the past, the formation of frost line 38 was often not uniform around the blown film bubble 18, leading to irregularities in the stretching and ultimate thickness of the plastic film. In accordance with the invention, a water cooling apparatus 40 is provided in the vicinity of the frost line 38, downstream from the air cooling apparatus 30 in the direction of travel 20, and between the air cooling apparatus 30 and the nip rollers 24. The water cooling apparatus 40 includes a wet porous material 42 positioned for direct contact with the blown film bubble 18. Suitably, the wet porous material 42 surrounds an outer circumference 44 of the blown film bubble 18, so that the wet porous material 42 continuously wipes the outer circumference 44 of the blown film bubble 18 with water as the blown film bubble 18 moves along the travelling path 20.

The wet porous material 42 is suitably shaped like a cylinder such that the blown film bubble 18 passes through the cylinder and is wiped with water around its entire circumference 44. The wet porous material 42, upon contact with the blown film bubble 18, causes immediate and uniform further cooling of the blown film bubble 18. This rapid and uniform cooling results in a more uniform frost line 38 and a more uniform stretching and thickness of the plastic blown film. Passing the blown film bubble 18 through the cylindrical wet porous material 42 also imposes a physical restraint that prevents any further widening and expansion of the blown film bubble 18.

The wet porous material 42 can be any porous material that is capable of transmitting water through its thickness. The wet porous material 42 can be a cloth or screen, and is suitably a mesh screen. The screen may have a mesh size of about 100 to about 500 mesh (about 25 to about 150 microns), suitably about 400 to about 500 mesh (about 25 to about 37 microns). In one embodiment, the wet porous material 42 is formed of a Dutch weave wire mesh screen.

If the wet porous material 42 is a metal mesh screen, it can be self-supporting and there is no need for a backing. If the wet porous material 42 is a cloth or a soft screen, it may require a sturdy support backing. In one embodiment, the water cooling apparatus 40 further includes a rigid porous backing 46, which can be a cylindrical backing, supporting the wet porous material 42. The rigid porous backing 46 can be a perforated metal backing with small holes (suitably having about a ⅛ inch diameter) spaced close enough together to permit the water to penetrate to the cloth. In an alternative embodiment, a soft porous material such as one made of polyester fibers or terry cloth can be stitched or otherwise mechanically attached to a mesh screen cylindrical backing using nylon threads or another suitable means of attachment, whereupon the combination of the soft material and mesh screen serves as the wet porous material.

The wet porous material 42 can be maintained in a uniform wet state by supplying an atomized water/air spray mixture to an outside surface 48 of the wet porous material 42. The atomized water/air spray mixture is supplied from a pipe 50 connected to a source 54, and feeds a manifold 52. The manifold 52 can be a single manifold that is circular and surrounds the entire outside surface 48 of an upper portion 56 of the wet porous material 42 as shown in FIG. 2. Use of a single circular manifold 52, with uniformly spaced spray openings, permits an even distribution of the water/air spray mixture around the circumference of the wet porous material 42.

The manifold 52 can be positioned inside a housing 58, which can be cylindrical and can enclose the wet porous material 42 and (if used) the rigid support backing 46. The housing 58 includes a divider 60 that separates an upper chamber 62 of the housing 58 from a lower chamber 64 of the housing 58. The atomized water/air spray mixture is applied continuously in the upper chamber 62 toward the upper portion 56 of the wet porous material 42 as shown.

Some of the water thus applied to the wet porous material 42 flows downward due to gravity into the lower portion 66 of the wet porous material 42 located in the lower chamber 64. The completely wetted porous material 42 contacts the exterior surface of the blown film bubble 18 as the blown film bubble 18 moves in the direction of travel 20. The effect of this continuous contact is to complete the quenching of the blown film bubble 18 while limiting its diameter and blow-up ratio to the diameter of the cylinder defined by the wet porous material 42. The wet porous material 42 should therefore be configured as a cylinder that corresponds to the desired diameter and blow-up ratio of the blown film bubble 18. By controlling the quenching and diameter of the blown film bubble 18 in this fashion, the thickness of the blown film is also controlled more uniformly around the circumference of the blown film bubble 18, thereby reducing or eliminating thickness disparities that are common in blown film lines that utilize only air quenching and/or non-contact water quenching.

Excess water can be removed from the lower portion 66 of the wet porous material 42 by applying a vacuum to the lower chamber 64 using a vacuum suction device 70, such as a vacuum pump, connected to an outlet 72 leading from the lower chamber 68. The vacuum suction device 70 removes any excess water from the wet porous material so as to maintain the floor and surrounding area in a dry state. As shown in FIG. 2, one purpose of the divider 60 is to isolate the lower chamber 64 in a manner that facilitates application of a vacuum. As shown in FIG. 1, the excess water thus removed can be recycled back into the source 54 that supplies the atomized water/air mixture.

The uniformly quenched and sized blown film bubble 18 then passes to the collapsing frame 22 and nip rollers 24, where the bubble 18 is collapsed into a flat film 74. The flat film 74 may be slit on both sides and separated using a slitting apparatus (not shown) or may pass directly to a series of winding rollers 78 and be wound on a film roll 80.

FIGS. 3 and 3A schematically illustrate an alternative embodiment of a blown film line 100, which is a downward blown film line. The details of blown film line 100 can be the same or similar to blown film line 10, except that the film bubble 118 travels in a downward path 120 instead of an upward path. The blown film bubble 118 is extruded downward from the annular blown film die 116 and can be extruded as a single layer or multilayer film having any number of layers. In order to demonstrate the flexibility of the invention, the blown film line 100 is shown not to have an air quenching apparatus, and is only shown to have a water cooling apparatus 140. However, an air cooling apparatus can be included for the reasons described with respect to the upward blown film line 10 shown in FIGS. 1 and 2.

The blown film bubble 118 passes in a downstream direction of travel 120 (in this case, downward) through the cylindrical shaped wet porous material 142 in a sliding fashion, so that the blown film bubble 118 directly contacts the wet porous material 142 and is wiped with water as it moves. The wet porous material 142, upon contact with the blown film bubble 118, causes immediate and uniform quenching of the blown film bubble 118. This rapid and uniform cooling results in a more uniform frost line (not shown) and a more uniform stretching and thickness of the plastic blown film. Passing the blown film bubble 118 through the cylindrical wet porous material 142 also imposes a physical restraint that prevents any further widening and expansion of the blown film bubble 118.

If needed, the water cooling apparatus 140 can also include a rigid backing (not shown) that supports the wet porous material 142. The wet porous material 142 can be maintained uniformly wet by supplying an atomized water/air spray mixture via housing 158 to the outer surface 148 of the wet porous material 142. The atomized water/air spray mixture is continuously supplied to an upper portion 156 of the wet porous material 142. Due to gravity, some of the water flows downward to a lower portion 166 of the wet porous material 142. In the embodiment shown, water is supplied from a pipe 150 and air is supplied from a pipe 151, both of which feed a circular manifold 152 that extends around the circumference of the blown film bubble 118 at a sufficient distance to spray the outer surface 148 of the wet porous material 142. The water and air converge in the manifold 152 under sufficient pressure that the nozzles 153 in the manifold 152 eject the water/air mixture in the form of an atomized spray toward the wet porous material 142.

The manifold 152 can be positioned inside a housing 158, which can be cylindrical and can enclose the wet porous material 142 and (if used) a rigid support backing. The housing 158 includes a divider 160 that separates an upper chamber 162 of the housing 158 from a lower chamber 164 of the housing 158. The atomized water/air spray mixture is applied continuously in the upper chamber 162 toward the upper portion 156 of the wet porous material 42 as shown. Some of the water flows downward due to gravity into the lower portion 166 of the wet porous material 142 located in the lower chamber 164. The completely wetted porous material 142 contacts the exterior surface of the blown film bubble 118 as the blown film bubble 18 moves in the direction of travel 120. The effect of this continuous contact is to complete the quenching of the blown film bubble 118 while limiting its diameter and blow-up ratio to the diameter of the cylinder defined by the wet porous material 142.

Excess water can be removed from the lower portion 166 of the wet porous material 42 by applying a vacuum to the lower chamber 164 using a vacuum suction device 170, such as a vacuum pump, connected to an outlet 172 leading from the lower chamber 164. The vacuum suction device 170 removes any excess water from the wet porous material so as to maintain the floor and surrounding area in a dry state. The divider 160 isolates the lower chamber 164 in a manner that facilitates application of a vacuum.

The uniformly quenched and sized blown film bubble 118 then passes to the collapsing nip rollers 124, where the bubble 118 is collapsed into a flat film 174. The flat film 174 may be slit on both sides and separated using a slitting apparatus (not shown) and may be wound on a film roll 180.

The blown film line 10 or 110 can be used to manufacture a wide variety of blown films having improved frost line uniformity (hence, more uniform crystallization) and improved uniformity of film stretching and film thickness. The blown film bubble 18 or 118 may be a single-layer extruded blown film, or a multilayer coextruded blown film having any number of layers. The blown film bubble 18 or 118 may be composed of microlayers, nanolayers, or any combination of different layer thicknesses.

EXAMPLE

A single layer film of Dowlex® 2045 linear low density polyethylene was extruded from a 1-inch by 4-inch annular downward-facing blown film die. Initially, the film was only air cooled using room temperature air supplied from an air cooling ring positioned around the bubble in the vicinity of the die opening. The blown film thus produced was hazy and dull.

The film was then repeated except that a water cooling ring was applied downstream from the air cooling ring and in the vicinity of the frost line. The water cooling apparatus included a terrycloth wet wiping medium surrounding and in direct contact with the blown film bubble. The cylindrical-shaped terrycloth wet wiping medium was maintained in a uniform wet state by uniformly supplying an atomized water/spray mixture to the outside surface of the wire mesh screen. The film thus produced was sparkly and clear compared to the film that was quenched only using air. This can be attributed to reduced crystallinity and less growth of spherelitic crystals. The film also had uniform thickness around the circumference of the bubble.

The embodiments of the invention described herein are exemplary. Various modifications and improvements can be made without departing from the spirit and scope of the invention. The scope of the invention is indicated by the appended claims, and all changes that fall within the meaning and range of equivalents are intended to be embraced therein.

I claim:
1. A blown film line, comprising:
    an annular die;
    a plurality of nip rollers at a location remote from the annular die;
    a blown film bubble extruding from the annular die and traveling toward the nip rollers along a traveling path;
    an air cooling apparatus in the vicinity of the annular die and directing cooling air toward the blown film bubble; and
    a water cooling apparatus located downstream from the air cooling apparatus along the traveling path;
    wherein the water cooling apparatus includes a wet porous material in direct contact with the blown film bubble and surrounding an outer circumference of the blown film bubble, the wet porous material continuously wiping the outer circumference of the blown film bubble with water as the blown film bubble moves along the traveling path, wherein the wet porous material comprises a Dutch weave wire mesh screen.
2. The blown film line of claim 1, wherein the Dutch weave wire mesh screen has a mesh size of about 100 to about 500 mesh.

3. The blown film line of claim 1, wherein the wet porous material is shaped like a cylinder and the blown film bubble passes through the cylinder in direct contact with the wet porous material.

4. The blown film line of claim 3, wherein the water cooling apparatus further comprises a rigid cylindrical backing supporting the wet porous material.

5. The blown film line of claim 1, wherein the water cooling apparatus further comprises a vacuum suction device positioned to remove excess water from the wet porous material.

6. An apparatus for making blown film comprising:
an annular die for extruding a blown film bubble;
an air cooling device in the vicinity of the annular die for applying cooling air to the blown film bubble;
a plurality of nip rollers at a location remote from the annular die for collapsing the blown film bubble; and
a water cooling apparatus located between the air cooling device and the plurality of nip rollers, the water cooling device including a porous material formed as a cylinder, an atomizing air-water spray device for applying water to the porous material, and a vacuum suction device for removing excess water from the porous material;
wherein the porous material comprises a Dutch weave wire mesh screen.

7. A blown film line, comprising:
an annular die;
a plurality of nip rollers at a location remote from the annular die;
a blown film bubble extruding from the annular die and traveling toward the nip rollers along a traveling path;
an air cooling apparatus in the vicinity of the annular die and directing cooling air toward the blown film bubble; and
a water cooling apparatus located downstream from the air cooling apparatus along the traveling path;
wherein the water cooling apparatus includes a wet porous material in direct contact with the blown film bubble and surrounding an outer circumference of the blown film bubble, the wet porous material continuously wiping the outer circumference of the blown film bubble with water as the blown film bubble moves along the traveling path;
wherein the water cooling apparatus further comprises a screen cylindrical backing supporting the wet porous material and the wet porous material comprises a soft porous material and is mechanically attached to the screen cylindrical backing by stitching.

8. The blown film line of claim 7, wherein the water cooling apparatus is configured to apply an atomized water/air spray mixture to an outside surface of the wet porous material.

9. The blown film line of claim 7, wherein the annular die comprises a single layer extrusion die.

10. The blown film line of claim 7, wherein the annular die comprises a multilayer coextrusion die.

11. The blown film line of claim 7, wherein the blown film bubble comprises a plurality of microlayers.

12. The blown film line of claim 7, wherein the blown film bubble comprises a plurality of nanolayers.

13. The blown film line of claim 7, wherein the soft porous material comprises a cloth.

14. An apparatus for making blown film comprising:
an annular die for extruding a blown film bubble;
an air cooling device in the vicinity of the annular die for applying cooling air to the blown film bubble;
a plurality of nip rollers at a location remote from the annular die for collapsing the blown film bubble; and
a water cooling apparatus located between the air cooling device and the plurality of nip rollers, the water cooling device including a porous material formed as a cylinder, an atomizing air-water spray device for applying water to the porous material, and a vacuum suction device for removing excess water from the porous material;
wherein the water cooling apparatus further comprises a screen cylindrical backing supporting the porous material and the porous material comprises a soft porous material and is mechanically attached to the screen cylindrical backing by stitching.

15. The apparatus of claim 14, wherein the soft porous material comprises a cloth.

* * * * *